Oct. 3, 1967  W. W. WILSON  3,344,633
AUTOMATIC BENDING BRAKE
Filed Sept. 16, 1964  8 Sheets-Sheet 1
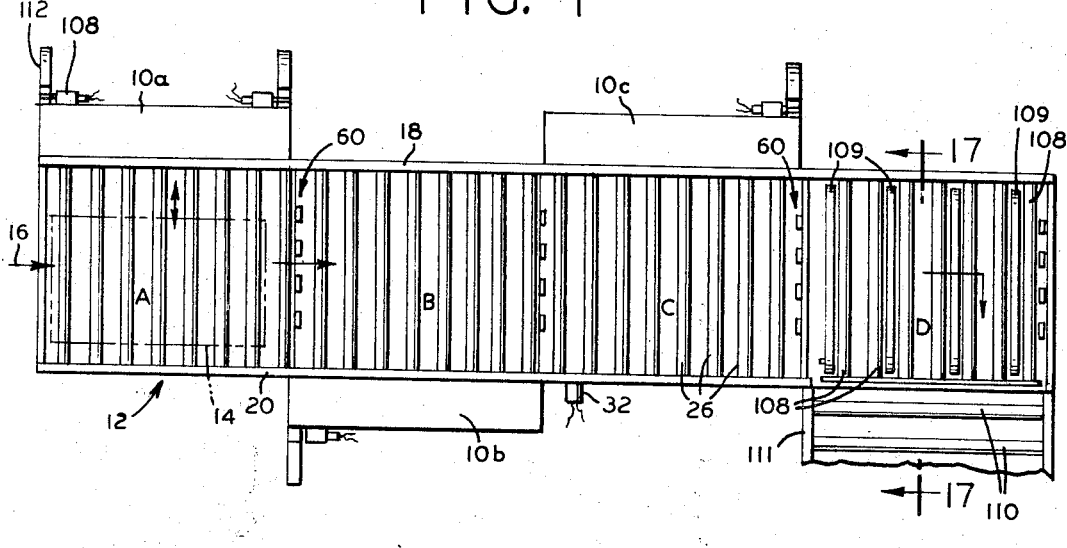
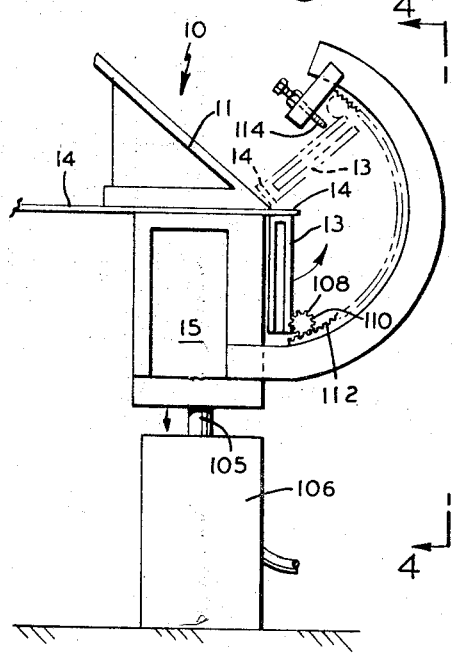
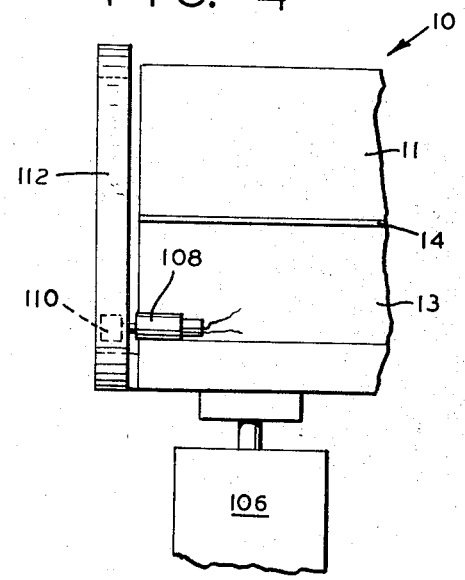
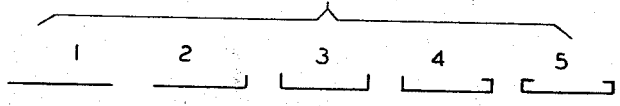
INVENTOR.
WALTER W. WILSON
BY
JOHN P. CHANDLER
HIS ATTORNEY.

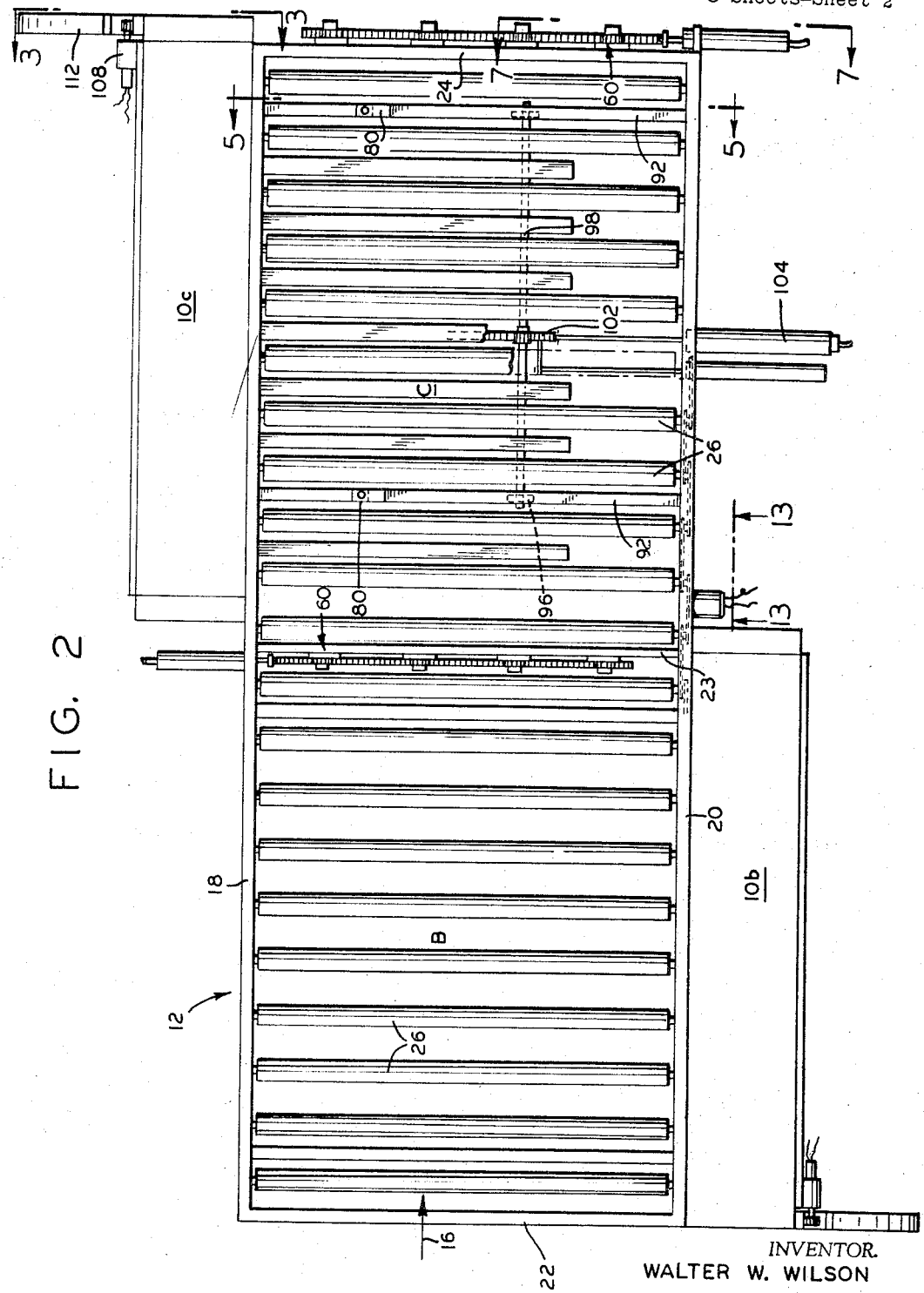

Oct. 3, 1967  W. W. WILSON  3,344,633
AUTOMATIC BENDING BRAKE
Filed Sept. 16, 1964  8 Sheets-Sheet 3

INVENTOR.
WALTER W. WILSON
BY
JOHN P. CHANDLER
HIS ATTORNEY.

Oct. 3, 1967

W. W. WILSON 3,344,633

AUTOMATIC BENDING BRAKE

Filed Sept. 16, 1964

INVENTOR.
WALTER W. WILSON
BY
JOHN P. CHANDLER
HIS ATTORNEY.

Oct. 3, 1967  W. W. WILSON  3,344,633
AUTOMATIC BENDING BRAKE
Filed Sept. 16, 1964  8 Sheets-Sheet 5
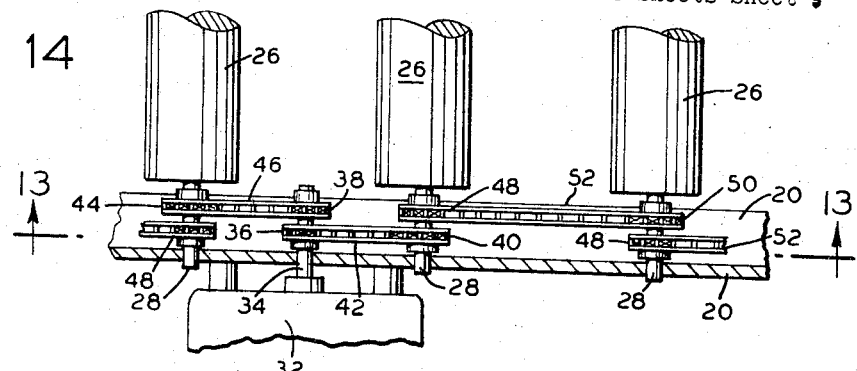
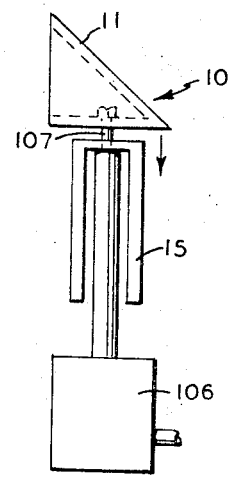
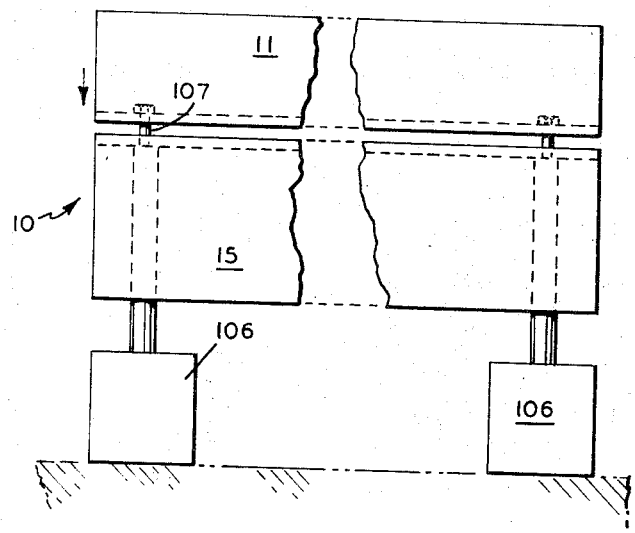
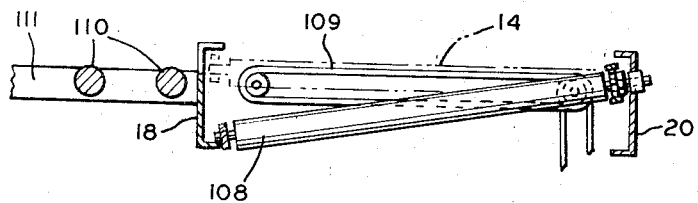
INVENTOR.
WALTER W. WILSON
BY
JOHN P. CHANDLER
HIS ATTORNEY.

Oct. 3, 1967
W. W. WILSON
3,344,633
AUTOMATIC BENDING BRAKE
Filed Sept. 16, 1964
8 Sheets-Sheet 6
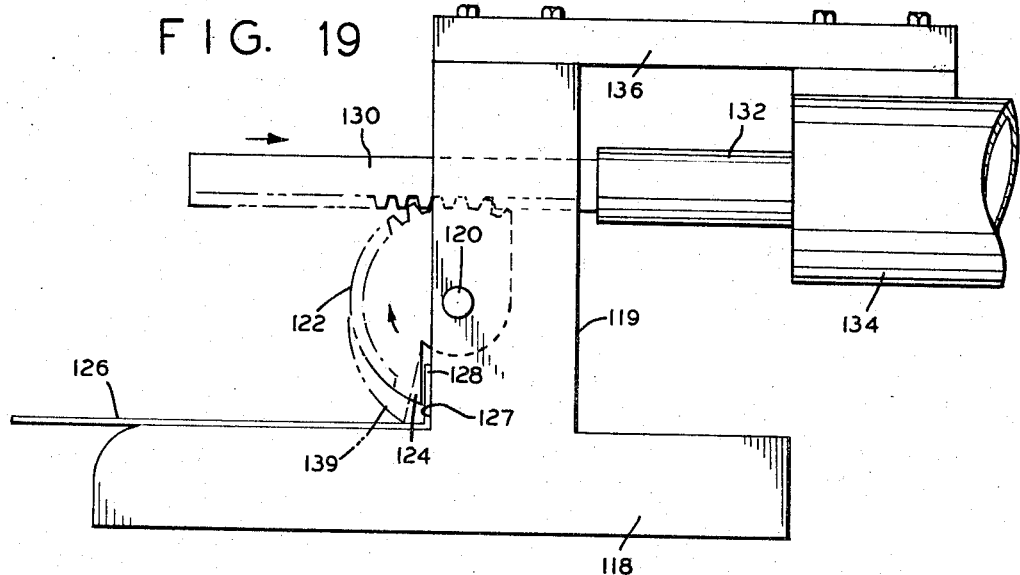
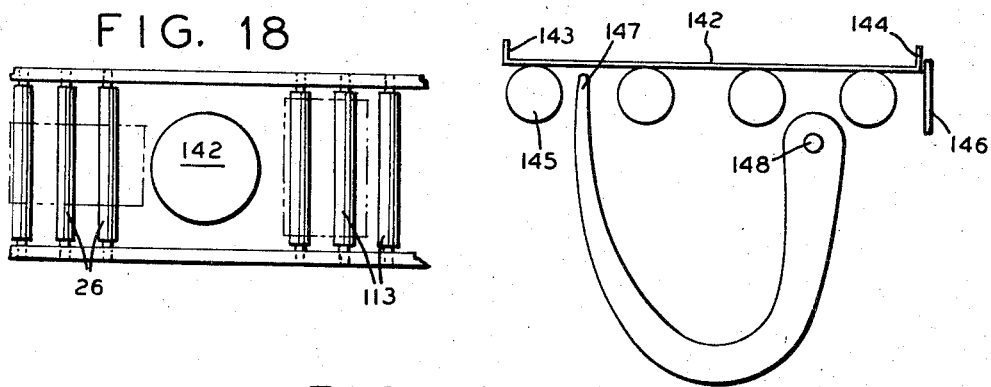
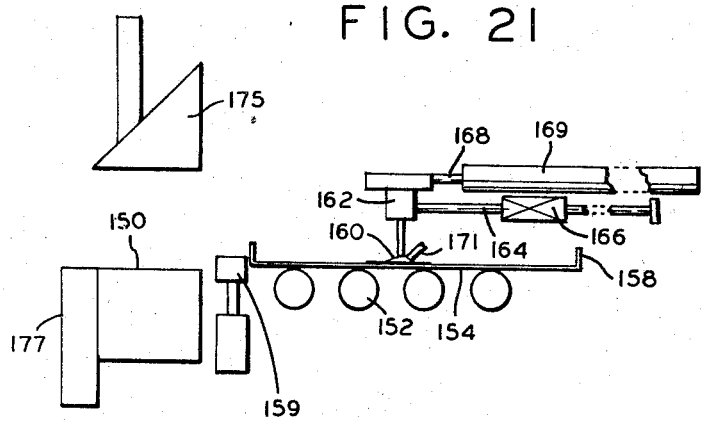
INVENTOR.
WALTER W. WILSON
BY
JOHN P. CHANDLER
HIS ATTORNEY.

Oct. 3, 1967  W. W. WILSON  3,344,633
AUTOMATIC BENDING BRAKE
Filed Sept. 16, 1964  8 Sheets-Sheet 7

INVENTOR.
WALTER W. WILSON
BY
JOHN P. CHANDLER
HIS ATTORNEY.

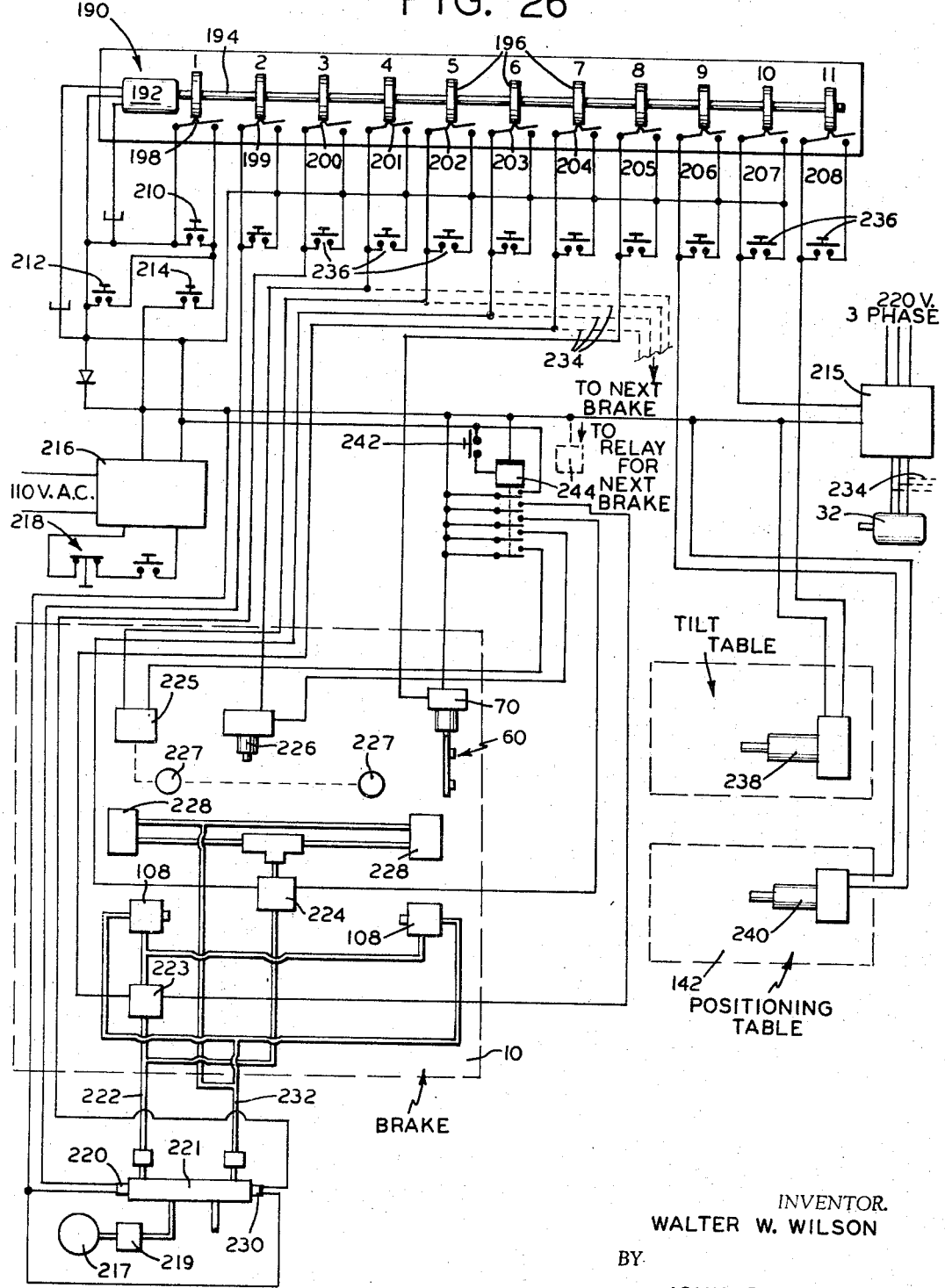

United States Patent Office 3,344,633
Patented Oct. 3, 1967

3,344,633
AUTOMATIC BENDING BRAKE
Walter W. Wilson, 43 Misty Pine Road,
Levittown, Pa. 19056
Filed Sept. 16, 1964, Ser. No. 396,868
15 Claims. (Cl. 72—14)

ABSTRACT OF THE DISCLOSURE

A fully automatic sheet metal bending machine with a conveyor which moves sheet metal blanks downstream and successively positions them at a plurality of brake stations for operation by the bending apparatus and then discharges them.

---

Figure 5:
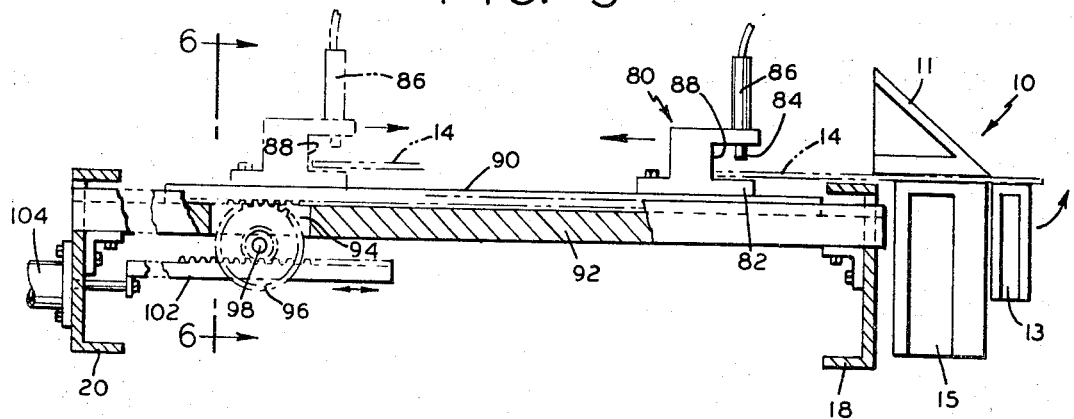

This invention relates to sheet metal bending machines and relates more particularly to an improved high speed, fully automatic machine for bending flanges along the sides of a rectangular blank of sheet metal.

The two most common types of sheet metal bending machines are, first, a hand or power operated leaf brake where a metal blank is clamped between a bed and a nose piece and a folding leaf, pivoted on a frame adjacent to the nose piece, is raised, bending the flange, and, second, the power brake where a male die moves downwardly into a female die, both usually with right angular corners, with the metal to be bent placed on the lower die as the upper descends.

Both of these require hand feeding and hand stacking after each bend. It is an object of the present invention to provide means for automatically feeding the pre-cut sheet metal blank, by novel conveyor means, downstream to successive brake assemblies where at each one of the latter, automatic stops, traversely disposed, arrest travel of the blank as pushers with clamping fingers accurately move the blank at right angles to its original path of travel, into a brake assembly where a bed and nose piece clamp the work piece therebetween and the folding apron then moves upwardly by a novel driven to perform the bend.

A particularly important feature of the invention is the arrangement for first rough positioning of the blanks followed by accurate positioning when they are fed to the precise position where the bend is performed. When the work piece encounters the transverse stops, it is roughly positioned and the pushers encounter the longitudinal edge and start the transverse travel. After sufficient movement to correct any cocked position, the fingers grasp the sheet and continue the travel. If a second bend is required along the same edge, the pushers move the work piece a second time and the operation of the folding leaf is repeated. The fingers then retract the blank and the conveyor then moves the blank downstream to a second brake mechanism which performs a folding operation along the opposite edge.

A substantially identical assembly lying at right angle to the first at the lower end thereof and the bends are performed along the remaining edges thereof. Another object of the invention is to provide a simple mechanism for the transfer of the sheets from the first conveyor to the second conveyor at right angle thereto. In this fashion, the position of the work piece is unchanged from the time it enters the conveyors until it is discharged at the lower end of the machine.

In another form of the invention, however, after the flanges have been formed along two edges, the work piece is simply rotated 90° by a turntable mechanism and a duplicate of the first brake section operates on the work piece along the two remaining edges.

Sometimes it becomes necessary to turn the sheet over to form a flange in the opposite direction and this is performed by an improved inverter which flips the sheet while in the course of its movement downstream without affecting its rough positioning.

Another object of the invention is to provide a novel brake apparatus which permits the work piece to pass righ through the brake when a flange has been formed which is too high to permit the piece to be retracted. This apparatus is provided at the very downstream end of the machine form which the piece is delivered.

It will be apparent from the foregoing that another object of the invention is to provide a non-palletized feeding and transfer systems for performing several bends in metal sheets, by the use of novel roller conveyors, stands and pushers which provide for free flow of the work pieces, as distinguished from the machine where a work piece is secured to and is held captive on a pallet or other carriage mechanisms which is clumsy and expensive.

A further object is to provide a novel drive for a folding leaf where, instead of an internal gear segment carried on the folding leaf, the leaf itself employs a small hydraulic motor with a pinion which engages the gear segment. This eliminates speed reduction units, always required for an electric motor drive, and complicated stop to limit the travel of the folding leaf.

Figure 6:
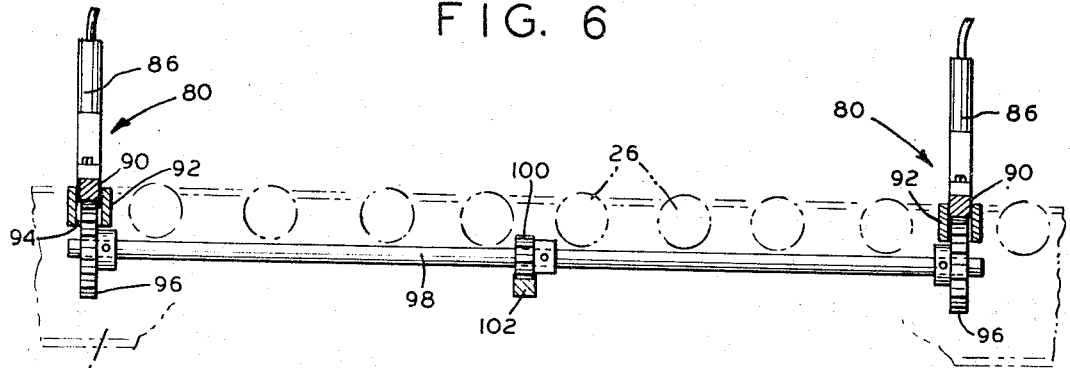
Figure 7:
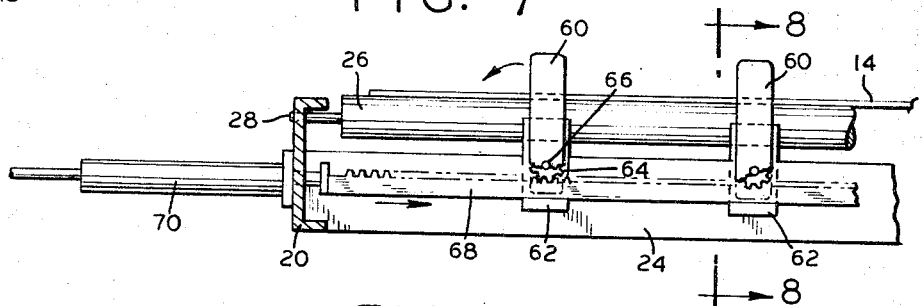
Figure 8:
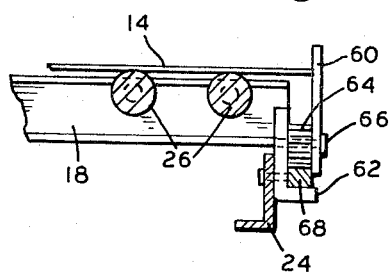
Figure 9:
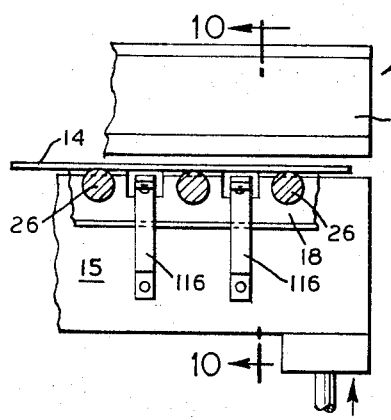
Figure 10:
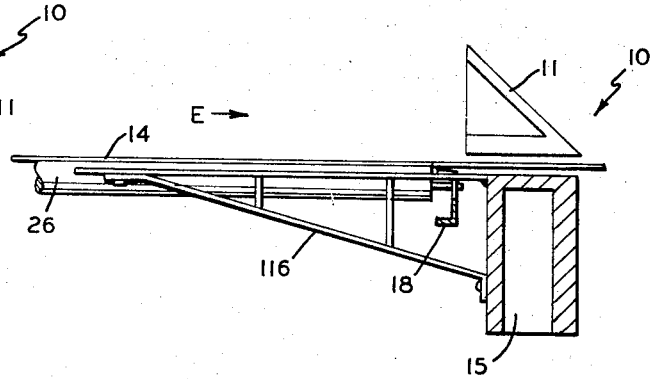
Figure 11:
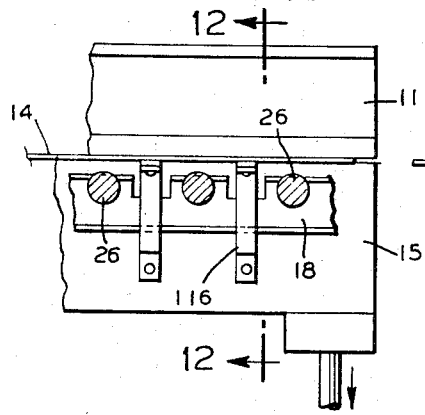
Figure 12:
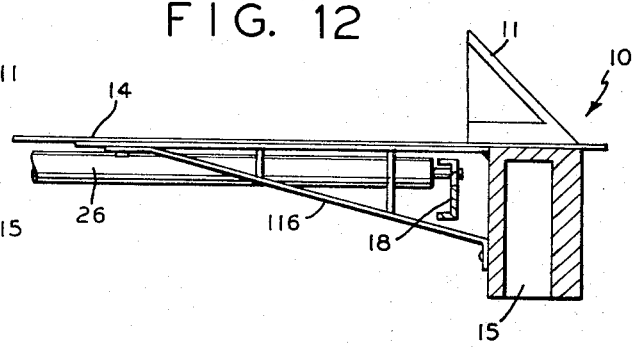
Figure 13:
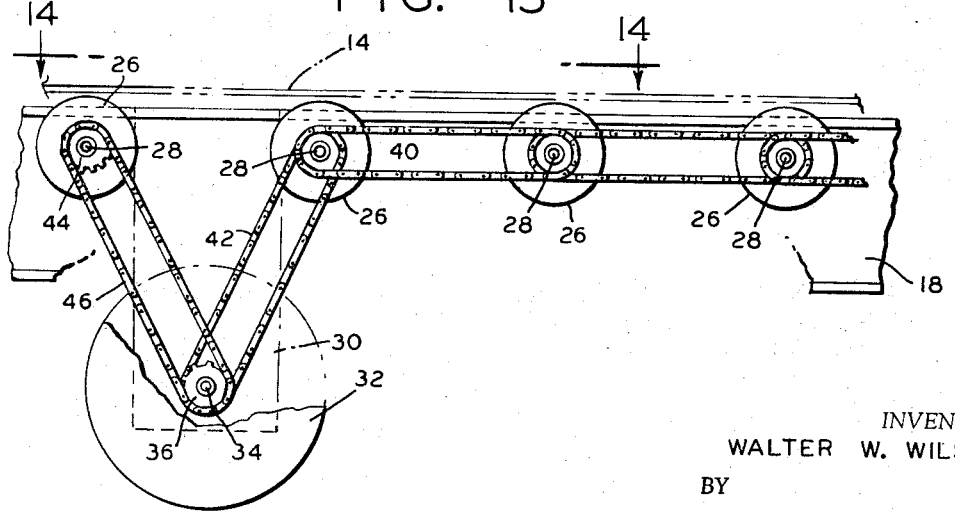
Figure 22:
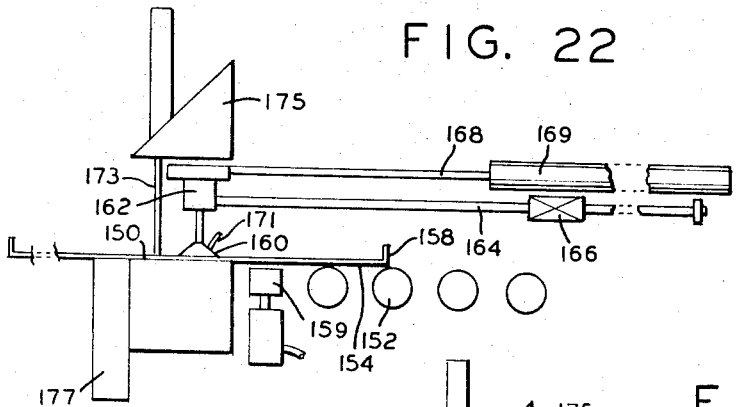
Figure 23:
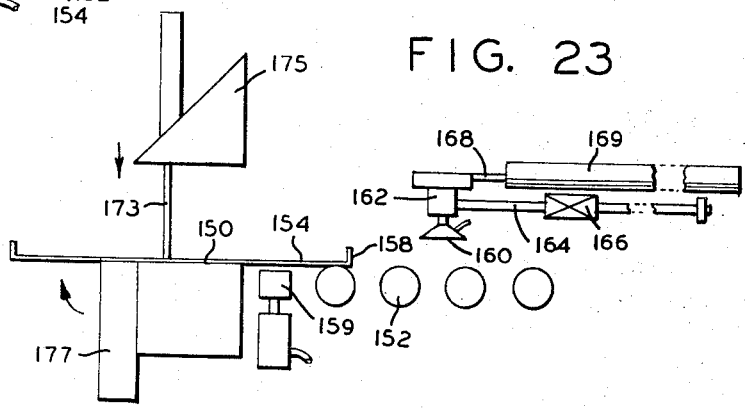
Figure 24:
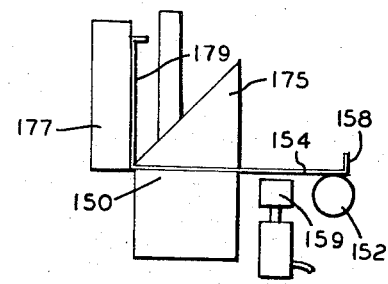
Figure 25:
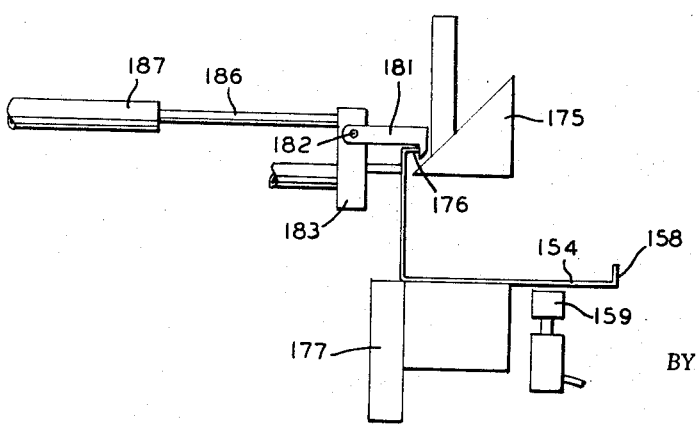

In the drawing:
FIG. 1 is a plan view of a bank of three brakes and means for transferring the sheets to a second machine disposed at right angles to the first;
FIG. 1A shows a number of typical bends on a single work piece;
FIG. 2 is an enladged plan view of a conveyor and two brakes;
FIG. 3 is an end view of one of the brakes;
FIG. 4 is a view along line 4—4 of FIG. 3;
FIG. 5 is a sectional view taken along line 5—5 of FIG. 2;
FIG. 6 is a sectional view taken along line 6—6 of FIG. 5;
FIG. 7 is a view along line 7—7 of FIG. 2;
FIG. 8 is a view along line 8—8 of FIG. 7;
FIG. 9 is a broken elevation from inside the machine looking in the direction of the arrow E in FIG. 10 and showing the bed and the nose piece in open position;
FIG. 10 is a sectional view taken along line 10—10 of FIG. 9;
FIG. 11 is similar to FIG. 9 but shows a sheet in clamped position, ready for bending;
FIG. 12 is a view taken along line 12—12 of FIG. 11;
FIG. 13 is a view taken along line 13—13 of FIG. 2;
FIG. 14 is a view taken along line 14—14 of FIG. 13;
FIG. 15 is a partial front elevational view of a typical brake;
FIG. 16 is an end view of the apparatus shown in FIG. 15;
FIG. 17 shows one means of delivering the workpieces to a second brake apparatus at right angles to the first;
FIG. 18 shows a turntable for rotating the workpiece 90°;
FIG. 19 shows an alternative form of workpiece clamp;
FIG. 20 illustrates an inverter for turning over the workpiece;
FIG. 21 illustrates an alternative arrangement wherein the workpiece passes completely through the brake after the final bend has taken place;
FIG. 22 shows the workpiece moved into the brake by a suction conveyor;
FIG. 23 shows the suction conveyor returned to starting position;
FIG. 24 shows the position of the parts after the final bend has taken place;

FIG. 25 shows the workpiece moving through the brake;
FIG. 26 is a circuit diagram.

The number of brakes which are used in an individual set-up can vary and of course would be determined by the particular work at hand, such as, for example, the three brakes 10 illustrated in FIG. 1. This particular arrangement incorporates a conveyor system 12 and two brakes on one side in staggered relationship to each other and one on the other side. This set-up is used for making three operations (or bends) on a sheet metal workpiece.

For purposes of illustration, let us consider a sheet 14 of metal moving upon the conveyor 12 in the direction of arrow 16 which was delivered from another conveyor, or manually positioned there at A. Upon arriving at position A, the sheet 14 is moved, by means to be described hereafter, into the brake 10a where it receives its first bend. It is then withdrawn from the brake 10a to position A from whence it is moved upon the conveyor 12 into position B. Here it is moved into the brake 10b where it receives its second bend, in this instance on the opposite side of the sheet. It is then withdrawn from brake 10b to position B from whence it is moved upon the conveyor 12 into position C to receive its third bend.

In the arrangement shown, a first bend is made along one longitudinal edge of the workpiece when moved laterally from position A and a second bend is then made along its opposite longitudinal edge when moved laterally from position B. The brakes at positions C and B can be reversed, however, and a second bend along the first edge operated on may immediately follow the second bend.

In this first arrangement each brake performs one bend only but in an alternative form of the invention, one brake may perform several successive bends. This is more readily understood by referring to FIG. 1A which shows the end view of a sheet, 1 before bending, 2 the first bend, 3 the second bend and the third bend 4 and the fourth and final bend 5.

The three brakes at positions A, B and C are adapted to perform bends along only two opposed edges of the workpiece. The machine for performing bends along the two remaining edges may be identical with the first except that its conveyors move the workpiece at right angles to its initial path of travel. The means for effecting the change of direction is shown at the right hand end of FIG. 1 and also in FIG. 17 and will be described later.

Referring now to FIGS. 2 through 14 the two brakes 10b and 10c and respective positions B and C are shown in FIG. 2, enlarged to more clearly illustrate the principal. The conveyor 12 comprises a frame of any suitable construction such as having side pieces 18 and 20 and end pieces 22 and 24. A plurality of rollers 26 are journalled at opposite ends in the sides 18 and 20 by shafts 28 as best seen in FIGS. 13 and 14. A bracket 30 depending from the side frame 20 supports an electric motor 32, which is positioned substantially central between two adjacent rollers 26. The shaft 34 of the electric motor 32 carries two sprockets 36 and 38. The sprocket 36 drives a sprocket 40 on the shaft 28 of the adjacent roller 26 at one side of the motor through the chain 42 while the sprocket 38 drives a sprocket 44 on the shaft 28 of the adjacent roller at the other side of the motor through a chain 46.

A second sprocket 48 on the shafts 28 drives a sprocket 50 on the next adjacent roller 26 through a chain 52. Each consecutive roller 26 is thus driven through a series of sprockets 48, 50 and chains 52 by the one motor 32.

As the sheet metal moves in the direction of the arrow 16 from, for example, position A into position B, the end of the sheet strikes against a set of upwardly projecting stops 60 which are positioned so that the sheet is located directly in front of the brake to perform a bending operation. This is best seen by reference to FIGS. 7 and 8, where the end piece 24 of the frame carries four L-shaped brackets 62 in spaced relation across the path of travel of the sheet, said brackets being secured to the end piece 24 by bolts 61. Each of the stops 60 is mounted at its power end upon a pinion gear 64. Each stop 60 is suitably secured to a pinion 64 and the two are mounted for conjoint rotation by means of a headed pin 66 secured at its inner end to the vertical portion of bracket 62. A rack 68 rides on the horizontal portion of the brackets and this rack engages the four pinions 64 in driving relation. It will now become apparent that by movement of the rack 68, the vertically positioned stops 60 can be rotated into horizontal position, out of the path of the metal sheet 14 to permit the sheet to pass to the next position. The movement of the rack is accomplished by a hydraulic piston 70 driven from a suitable hydraulic motor (not shown) and sequentially controlled as delineated below.

Each of stations A, B and C is provided with a pair of pusher clamps 80 which pick up the work piece 14 after it has arrived at its respective station and move it in a direction axially of the rollers 26 and into the bed 15 of the brake 10 between an upper fixed jaw or nose piece 11 and a lower pivoting jaw 13 which in the starting position of FIG. 3 is coplanar with the bend. The pusher clamp 80 comprises an anvil 82 against which a hydraulically operated rod 84 of cylinder 86 presses and clamps the sheet 14. A gaging surface 88 is provided against which the edge of the sheet metal 14 is positioned for proper location of the bend. As seen in FIGS. 5 and 6 the two pusher clamps 80 are each mounted upon a rack 90 which is slidably mounted in a guide member 92 which extends between sides 18 and 20. An opening 94 in the member 92 permits a gear 96 to protrude therethrough to mesh with the teeth of the rack 90. A shaft 98 carries the gears 96 at opposite ends and is journalled in the frame. A third pinion gear 100 is mounted upon the shaft 98 at any convenient location and is driven by a rack 102 which is energized by a hydraulic cylnder 104, having a piston (not shown) which travels a distance which is acurately adjustable since the extent of travel determines the height of the flange formed by the bend. In other words, in this form of the invention there is no adjustable stop against which the work piece moves.

After the pusher clamps 80 have positioned the sheet metal 14 a predetermined distance into the brake as described above, the bed 15 and the lower jaw 13 are raised by a piston rod 105 whose piston (not shown) is in a hydraulic cylinder 106 (FIG. 3) clamping the sheet metal 14 between the nose piece 11 and the bed 15 and pivoted jaw 13 ready for bending. The lower jaw 13 is angularly driven about its pivot by motor 108 through a pinion 110 on the end of its shaft and meshing with large gear segment or curved rack 112 with internal teeth which projects from the bed of the brake. While an electric motor may be used for this purpose, a novel hydraulic motor is preferable since it is small and powerful and can be stopped precisely as desired. FIG. 1 shows at the left two motors and segments which is preferable when bending thicker gauge metal. An adjustable stop 114 is mounted upon the free end of the segment 112 to gauge the angle of the bend in the sheet metal. As described above, the bed 15 of the brake is raised by the hydraulic cylinder 106 to clamp the sheet metal 14 between the lower and upper jaws. In order to prevent the sheet metal from buckling, a plurality of brackets 116 are attached to the bed of the brake as best seen in FIGS. 9 thru FIG. 12. These brackets support the sheet as it is raised into clamped position. FIGS. 12 and 11, from its delivered position, FIG. 10 and FIG. 9.

After bending operation, the brake is opened, to free the sheet metal, by cylinder 106, the pusher clamp 80 then withdraws the sheet metal 14 from the brake and deposits it upon the conveyor rollers 26 for movement to the next station.

The normal brake is constructed so that the bed is moved upwardly into clamping position with the jaws. However, an alternate method is shown in FIGS. 15, 16 wherein the bed 15 is stationary and the upper jaw 11 is movable downwardly by a hydraulic system including a cylinder 106 stationed at either end of the bed and having a piston rod 107 attached to the upper jaw 11 to operate it.

The second brake machine at right angles to the first, for performing bends on the two remaining edges of the sheet, was earlier mentioned in connection with FIG. 1. This second machine may be a substantial duplicate of the first and the right angular transfer is accomplished by the means shown in fragmentary fashion in FIG. 17. The terminal rollers 108 have means for dropping their left hand ends from the position shown in broken lines, where they are horizontal, to the full line position. When this occurs, the sheet becomes supported on endless belt conveyor 109 positioned between rollers 110 in the second machine disposed at right angles to the rollers 26, the rollers 110 being supported in side frames 111.

FIG. 18 shows another arrangement where, instead of providing a second machine at right angles to the first and the workpieces transferred from one conveyor, to the other moving at right angles to the first, there is provided, at the downstream end of the rollers 26 in the first machine, a simple turntable 112 which receives the workpieces and rotates 90° and then delivers the latter by conventional means to the rollers 113 in a second brake machine substantially identical with the first and the two remaining edges are operated upon.

The pusher clamp structure 80, earlier described, may be replaced, for certain types of work, by the work piece clamp and pusher of FIG. 19. The pusher has a base 118, movable towards the brake by suitable means (not shown). It also has a bifuracted post 119 supporting a pin 120 forming a pivot for a gear 122 having peripheral teeth and a clamping finger 124. The work piece 126 has a preformed angular flange 128 which is contacted by face 127 of the post as the pusher moves toward the brake.

At this moment, the gear is rotated to the clamping position shown, by a rack 130 having teeth engaging the teeth of the gear and mounted for sliding movement in a straight bearing opening in post 119. The rack is driven by a piston rod 132 having a piston (not shown) in an air or fluid cylinder 134 mounted on a bracket 136.

If the flange 128 is not present in the work piece, the gear 122 may be replaced by one which is modified only to the extent shown in dot-and-dash lines 139 so that as the gear rotates it simply clamps the flat work piece against the base 118 in much the same fashion as the rod 84 did in the earlier pusher.

An inverter for turning over the sheets when a reverse bend on the work piece is required is shown in FIG. 20. The work piece 142 with upturned flanges 143 and 144 is travelling on conveyor rollers 145 and when the latter encounters a stop 146 an arcuate finger 147 mounted on a rock shaft 148 is raised upwardly turning the work piece.

In the brake described herein, the work piece is moved into the brake a predetermined distance beyond the point of the nose piece, depending upon the height of the flange which is desired, and after the bend is performed the work piece is retracted to the roller conveyors. In some instances, this desired height of flange is too great to allow it to be pulled back and after this final, high flange is formed it is necessary to move the work piece right through the brake and out.

This structure is shown in FIGS. 21 to 25. It was earlier pointed out that the arrangement of the upwardly movable bed and the fixed nose piece can be reversed and this is employed in the present instance. The bed 150 is fixed and is on substantially the same plane as that of the conveying rollers 152 so that there will be no obstruction as the sheet 154 is delivered by the rollers to this final bending station. This sheet will usually have earlier formed flanges 156 and 155 on at least two sides.

The forward flange 156 is first delivered to a stop 159 and after the flange contacts this stop and a plurality of suction devices 160 contact the sheet, the stop 159 retracts downwardly to the position of FIG. 22. These suction cups are mounted on a header 162 supported by rods 164 journalled for straight line sliding movement in a fixed bearing 166. The header is moved toward the brake to an adjusted fixed position by a piston rod 168 passing into a fluid actuated cylinder 169 with a piston (not shown).

The suction devices are connected by a tube 171 to a source of negative pressure and before the pressure is released, hold down rods 173 descend and secure the sheet in place on the bed while the suction devices retract to the position of FIG. 23. The nose piece 175 now descends to clamp the work piece to the bed. The bending leaf 177 (FIG. 24) raises to make the final and high bend 179. A hook shaped member 181 pivoted at 182 on a bracket 183 moves forwardly engaging the free edge of flange 156 and following this, the nose piece raises and the bending leaf pivots downwardly (FIG. 25) to release the work piece which is now drawn rearwardly by piston rod 186 extending from piston cylinder 187 and connected with the bracket.

FIG. 26 is an electrical schematic showing one manner in which to operate and control the components of the present invention. A suitable multi-circuit cam timer 190 such as the 2400 series manufactured by Automatic Timing and Controls Inc. is operated from a 110 v. A.C. source. This timer consists of a motor 192 provided with an extension shaft 194 which carries a train of spaced cams 196. In this particular set-up there are eleven cams which operate a series of electrical on-off switches numbered 198 through 208. A braking section is included with the motor circuit and is also equipped with a selector switch 210 which, when in "off" position allows the cam train to make one cycle only and stop. When this switch is "on" the train cycles continuously. The first cam and associated switch 198 in the train controls this function. A push button switch 212 is provided for starting the cam train and a second push button switch 214 is provided for stopping the cam train.

Electrical energy for supplying all units of this system is channeled through a magnetic starter relay 216 which is provided with a start-stop button 218. The stop buttons, when depressed, cuts off all power to all units simultaneously and provides an emergency stopping feature.

The preferred mode of operation of the machine and the sequence of operation of the cams after the system has been energized is as follows:

Cam 10 closes switch 207 thus energizing a relay 215 which provides power to conveyor motor 32 (FIG. 1) and thereby transports a work piece into position adjacent a brake 10, stopping against stops 60.

Cam 2 closes switch 199 actuating a solenoid 220 in a hydraulic valve 221 to pressurized hydraulic line 222 up to valves 223 and 224. This energy is generated by a hydraulic pump 217 passing through a relief valve 219 to valve 221.

Cam 4 closes switch 201 actuating a pneumatic pusher 104 and associated mechanisms 102, 96, 92 and 80 (FIG. 5) to move work into the brake 10.

Cam 5 closes switch 202 to open pneumatic valve 225 and operate gripper cylinders 86 (FIG. 5) to clamp work.

Cam 6 closes a switch 203 opening valve 224 to operate hydraulic cylinders 106 which closes the brake 10.

Cam 7 closes switch 204 to open valve 223 which applies pressure to the hydraulic motors 108 (FIG. 1) rotating the leaf 13 of the brake 10.

Cam 3 closes switch 200 energizing solenoid 230 of hydraulic valve 221 while the solenoid 220 has been deenergized by cam 2 and switch 199 allowing pressure to enter line 232 and opening hydraulic line 222 back to the reservoir, thereby applying pressure to the opposite sides of cylinders 106 and motors 108 to lower the leaf 13 and open the brake 10.

Cam 8 operates switch 205 to energize pneumatic cylinder 70 (FIG. 7) which retracts stops 60 through its associated mechanical components, 64, 68 etc., thus clearing the conveyor path for movement of the work 14 to the next brake 10 when cam 10 again closes switch 207 to start the cycle again.

While the control and sequencing of the components of only one brake 10 are illustrated by the schematic, FIG. 26, it will be readily understood that a series of brakes such as illustrated in FIG. 1 can be controlled by the same cam timer 190 by connecting several brakes in parallel as indicated by the dotted connections 234.

To assist in setting up the machine and to facilitate repair problems, each of the cams 2 to 11 and associated switches is constructed with a normally open push button switch connected in parallel with its respective cam switch to provide manual means for actuating all functions of the system separately.

It is important that when cam 1 stops the motor 192 and is in static position, all switches 198 through 208 are in open position.

During the travel of the work piece 14 along the conveyor, it may arrive at a 90 degree turn such as indicated at station D FIG. 1. This is accomplished by a pneumatic cylinder 238 controlled by cam 11 and switch 208, causing the rollers 108 to pivot out of contact with the work 14 which then rests upon the belt 109 which carries it in a 90 degree direction onto the conveyor rollers 110, as best shown in FIG. 17.

It may be necessary also to reposition the work 14 upon the conveyor in any manner, such as the rotatable table 142 (FIG. 18), into a 90 degree position or 180 degrees from its original position. This is accomplished by driving the table 142 by an air cylinder 240 which is controlled by cam 9 and switch 206.

It will, of course, be appreciated that the controlling or timing cam 10 which controls the conveyor motor is set so that there is considerable over-travel of the conveyor so that when one work piece arrives at the stop 60 at one station (A for example), the motor continues to drive the conveyor so that if the next work piece simultaneously travelling to station B has not yet arrived at its stops 60 it will subsequently be carried into position.

A switch 242, which controls a relay 244 is connected in the circuit to each brake in order to provide a sure method of connecting or disconnecting each brake, and to insure against electrical feedback.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. In an automatic machine for bending flanges along opposed edges of a rectangular sheet metal plate, the combination of an elongated frame, a driven conveyor on the frame for moving the plate downstream, a plurality of brake assemblies along the sides of the frame and parallel with the path of movement of the plate, each assembly including a relatively movable bed and nose piece for receiving the blank therebetween in clamped relation, and a power driven folding leaf pivoted adjacent the nose piece for making the bend, retractable stops at the downstream end of each brake assembly, a pusher assembly with retractable clamping fingers for moving the blank into the brake assembly a predetermined distance for the bending operation and for retracting it back to the conveyor after the stops have retracted for travel to the next brake assembly.

2. The structure recited in claim 1 wherein a second machine with a conveyor and brake assemblies is located at the downstream end of the first and disposed at right angles to the first to form bends along the remaining edges of the plates, and automatic means are provided for delivering the plates from the first conveyor to the second.

3. The structure recited in claim 2 wherein said automatic means comprises a plurality of conveyors, movable laterally of the first conveyor and positioned just below the plane of said first conveyor, and means for depressing the first conveyor at said downstream end so the plate will be picked up by said laterally movable conveyors.

4. The structure recited in claim 1 wherein a second machine with a conveyor and brake assemblies is located at the downstream end of the first and means at said downstream end for rotating the plate 90° before delivery to the second conveyor.

5. The structure recited in claim 1 wherein the driving means for the folding leaf comprises a curved rack fixed on the frame and a motor driven gear is carried on the end of the folding leaf and meshing with said rack.

6. The structure recited in claim 1 wherein the driving member for the folding leaf comprises a curved rack with teeth fixed on the frame adjacent one end of the folding leaf, a hydraulic motor with a drive shaft is carried on said end of the folding leaf, and a pinion fast on the motor shaft engages the rack teeth.

7. The structure recited in claim 1 wherein the nose piece is fixed and the bed is movable upwardly into clamped relation with the underside of the plate.

8. The structure recited in claim 1 wherein the bed is fixed and the nose piece is movable downwardly into clamped relation with the upper side of the plate.

9. The structure recited in claim 1 wherein the pusher assembly has a face which engages and moves the plate and the clamping fingers engage the plate after said movement commences.

10. In an automatic machine for bending flanges along opposed edges of a rectangular sheet metal plate, the combination of a pair of side frames, driven conveyor rollers mounted between the side frames for moving the plates downstream, a plurality of brake assemblies parallel with the side frames, each assembly including a relatively movable bed and nose piece for receiving the plate therebetween in clamped relation, and a power driven folding leaf pivoted adjacent the nose piece for making the bend, retractable stops at the downstream end of each brake assembly, a pusher assembly with retractable clamping fingers for moving the plate into the brake assembly a predetermined distance for the bending operation and for retracting it back onto the rollers after the stops have retracted, for travel to the next brake assembly.

11. The structure recited in claim 10 wherein a second machine with conveyor rollers and brake assemblies is located at the downstream end of the first for bending flanges along the remaining opposed edges of the plate, and means for changing the position of the plates for presenting said remaining edges to the brake assemblies.

12. The structure recited in claim 10 wherein the last brake assembly at the downstream end of the machine is provided with means for bending a relatively high flange along the adjacent edge of the plate, and for moving the finished plate completely through the brake assembly.

13. The structure recited in claim 10 wherein a second machine with conveyor rollers and brake assemblies is located at the downstream end of the first at right angles thereto to form bends along the remaining edges of the plates, and automatic means are provided for delivering the plates to the second conveyor rollers.

14. The structure recited in claim 13 wherein said latter means comprise endless belt conveyors positioned between the downstream rollers, and means are provided for lowering said terminal rollers so that the plates will be picked up by said belt conveyors and delivered to the second conveyor rollers.

15. In an automatic machine for bending flanges along two-edges of rectangular sheet metal plates, the combination of a pair of side frames, driven conveyor rollers mounted between the side frame for moving the plates downstream, a plurality of brake assemblies parallel with the side frames, each including a relatively movable bed and nose piece for receiving the plate therebetween in clamped relation, and a power driven folding leaf pivoted adjacent the nose piece for making the bend, rotatable stops at the downstream end of each brake assembly for arresting movement of the plate, a pusher assembly with retractable clamping fingers for moving the blank into the brake assembly a predetermined distance for the bending operation and for retracting it back to the rollers after the stops have retracted for travel to the next brake assembly, means for adjusting the travel of the pusher assembly to vary the height of the flange, a second brake and conveyor assembly at the downstream end of the first assembly and disposed at right angles thereto for bending flanges along the remaining edges of the plates, and means for delivering the plates from the first to the second conveyor assembly.

References Cited
UNITED STATES PATENTS

| | | | |
|---|---|---|---|
| 1,744,391 | 1/1930 | Kuehn | 72—319 |
| 2,217,378 | 10/1940 | Nilsby | 72—319 |
| 2,975,818 | 3/1961 | Rippe | 72—421 |
| 3,118,327 | 1/1964 | Eastman | 72—405 |

CHARLES W. LANHAM, *Primary Examiner.*

R. D. GREFE, *Assistant Examiner.*